(12) United States Patent
You

(10) Patent No.: US 10,302,203 B2
(45) Date of Patent: May 28, 2019

(54) TANDEM CONICAL VALVE

(71) Applicant: Yinsen You, Fujian (CN)

(72) Inventor: Yinsen You, Fujian (CN)

(*) Notice: Subject to any disclaimer, the term of this patent is extended or adjusted under 35 U.S.C. 154(b) by 0 days.

(21) Appl. No.: 15/744,071

(22) PCT Filed: Oct. 13, 2016

(86) PCT No.: PCT/CN2016/102029
§ 371 (c)(1),
(2) Date: Jan. 12, 2018

(87) PCT Pub. No.: WO2017/071482
PCT Pub. Date: May 4, 2017

(65) Prior Publication Data
US 2018/0202561 A1 Jul. 19, 2018

(30) Foreign Application Priority Data

Oct. 26, 2015 (CN) .......................... 2015 1 0703641
Jan. 15, 2016 (CN) ..................... 2016 2 0036398 U

(51) Int. Cl.
*F16K 5/02* (2006.01)
*F16K 39/06* (2006.01)
(Continued)

(52) U.S. Cl.
CPC .......... *F16K 5/0235* (2013.01); *F16K 5/0207* (2013.01); *F16K 5/0214* (2013.01);
(Continued)

(58) Field of Classification Search
CPC ...... F16K 5/0235; F16K 5/0214; F16K 39/06; F16K 5/0207; F16K 5/08
(Continued)

(56) References Cited

U.S. PATENT DOCUMENTS 973,816 A * 10/1910 Rowell
1,214,267 A * 1/1917 Block
(Continued)

FOREIGN PATENT DOCUMENTS

CN 202327173 7/2012
CN 202580101 12/2012
(Continued)

*Primary Examiner* — Marina A Tietjen
(74) *Attorney, Agent, or Firm* — JCIPRNET

(57) ABSTRACT

Provided is a tandem cone valve capable of avoiding or reducing resistance on a valve switch caused by fluid pressure in a pipeline in the opening or closing stage. The cone valve includes valve rods, valve cores and a valve body. The valve cores include a first valve core and a second valve core. The first valve core and the second valve core are coaxially arranged in a valve core cavity. The outer walls of the valve cores are in the shape of cones; the first valve core and the second valve core are stacked one on the other, the first valve core is provided with a first valve core first flow hole and a first valve core second flow hole which penetrate through the inner wall and the outer wall of the first valve core, and the valve core cavity is provided with a valve core cavity flow hole corresponding to the first valve core first flow hole and the first valve core second flow hole. The cone valve is provided with the second valve core stacked coaxially on the base of the first valve core, and the second valve rod driving the second valve core to rotate is arranged in the first valve rod in a sleeved manner, thus the valve is simple and compact in structure; and the two levels of valve cores can each rotate to open/close the valve level by level, thus reducing momentary resistance when opening and closing a large cone valve.

6 Claims, 9 Drawing Sheets

(51) Int. Cl.
*F16K 5/10* (2006.01)
*F16K 5/08* (2006.01)

(52) U.S. Cl.
CPC .................. *F16K 5/08* (2013.01); *F16K 5/10* (2013.01); *F16K 39/06* (2013.01)

(58) Field of Classification Search
USPC .............. 137/637.5, 552.5, 637, 630, 614.17
See application file for complete search history.

(56) References Cited

U.S. PATENT DOCUMENTS

| | | | |
|---|---|---|---|
| 1,503,461 A | * | 8/1924 | Ackroyd |
| 1,504,498 A | * | 8/1924 | Petcher |
| 3,426,795 A | * | 2/1969 | Muller |

FOREIGN PATENT DOCUMENTS

| | | | |
|---|---|---|---|
| CN | 203784343 | | 8/2014 |
| DE | 102006055536 A1 | * | 6/2008 |
| GB | 318747 A | * | 9/1929 |

* cited by examiner

TANDEM CONICAL VALVE

CROSS-REFERENCE TO RELATED APPLICATION

This application is a 371 application of International PCT application serial no. PCT/CN2016/102029, filed on Oct. 13, 2016, which claims the priority benefit of China application no. 201510703641.8, filed on Oct. 26, 2015 and the priority benefit of China application no. 201620036398.9, filed on Jan. 25, 2016. The entirety of each of the above-mentioned patent applications is hereby incorporated by reference herein and made a part of this specification.

TECHNICAL FIELD

The present invention relates to the technical field of valves for conducting or cutting off a fluid passage and regulating fluid flow.

BACKGROUND

A valve is a device in a fluid system used to control the direction, pressure, and flow of a fluid, and flowing or stopping the fluid (liquid, gas, powder) in the pipe and equipment and controlling its flow. The valve is a control component in the pipeline fluid delivery system, which is used to change the cross-section of the passage and the flow direction of the medium. The valve has the functions of conducting, cutting off, throttling, checking, shunting or overflow pressure relief. A wide variety of valves for fluid control range from the simplest shut-off valves to various valves used in the most sophisticated automatic control systems.

In order to meet the requirements of the performance of the valves used in the modern petrochemical industry and the food and drug industry, in particular the requirements that the internal structure is simple and free of dead angles and abrasion resistance, the inventor has designed a conical valve which satisfies such requirements with a unique structure. The conical valve has the performance of a gate valve, but the gate is a conical surface and free of dead angles inside the valve body; it has the performance of a shut-off valve but simple inside, and moves the forced seal pressure applying mechanism of the valve core to the valve body to the outside of the valve body; it has the performance of the plug valve but free of dead angles inside, and relatively speaking, can reduce more weight of materials; it has performance of ball valve but free of dead angles inside, and relatively speaking, can reduce more weight of materials, it has the performance of the butterfly valve and can realize forced seal. Self-healing and wear resistance of the conical valve are better than the existing valve.

In the following documents, more information related to the above technical solution may also be found. For example, Chinese patent documents with publication numbers CN202580101U, CN203784343U, and CN202327173U all disclose the related technical solutions of the conical valve in the background art.

In the process of implementing the present invention, the inventor finds the following problems from the background art: as for the conical valve, the opening and closing moment resistance of the valve is particularly large when the valve drift diameter is larger or the pressure of the pipeline is higher. The inventor considers adopting a method of creating a separate bypass to keep both sides of the gate with similar fluid pressure for opening and closing the gate, smaller secondary gate valves are opened and closed after the primary gate valves are opened and closed, but such valves and pipelines are of complex structures.

SUMMARY OF THE INVENTION

To this end, there is a need to provide a conical valve that avoids or reduces the resistance caused by the pressure of the fluid in the pipeline to the valve switch during the opening or closing phase.

To achieve the above objective, the inventor provides a tandem conical valve comprising a valve stem, a valve core and a valve body, the valve stem comprises a first valve stem and a second valve stem, and the valve core comprises a first valve core and a second valve core;

the valve body has a fluid inlet and a fluid outlet, the valve body is provided with a valve core cavity for accommodating the first valve core and the second valve core, and a valve stem hole for the first valve stem and the second valve stem to pass through, and the valve stem hole penetrates from a surface of the valve body to the valve core cavity;

the first valve stem and the second valve stem are coaxially provided, with the second valve stem being sleeved in the first valve stem, and the first valve stem and the second valve stem are relatively rotatable;

the first valve core and the second valve core are coaxially provided in the valve core cavity, an outer wall of the first valve core is matched with an inner wall of the valve core cavity, the first valve core is connected with the first valve stem and driven by the first valve stem to rotate by taking the first valve stem as an axis; an outer wall of the second valve core is matched with an inner wall of the first valve core, the second valve core is connected with the second valve stem and driven by the second valve stem to rotate by taking the second valve stem as an axis, and the first valve core and the second valve core are relatively rotatable;

outer walls of the first valve core and the second valve core are conical surfaces, a lower end opening of the first valve core and a lower end opening of the second valve core correspond to lower end openings of the conical surfaces, the first valve core is stacked with the second valve core, the second valve core is smaller than the first valve core, the first valve core is provided with a first flow bore of the first valve core and a second flow bore of the first valve core which penetrate the inner wall and the outer wall of the first valve core, a valve core cavity is provided with a flow bore of the valve core cavity corresponding to the first flow bore of the first valve core and the second flow bore of the first valve core, the second valve core is provided with a flow bore of the second valve core which penetrates the inner wall and the outer wall of the second valve core, the flow bore of the second valve core corresponds to the second flow bore of the first valve core;

when the first valve core is rotated to the first flow bore of the first valve core to be communicated with the flow bore of the valve core cavity, a fluid passage between the fluid inlet and the fluid outlet is communicated with the flow bore of the valve core cavity through the lower end opening of the first valve core and the first flow bore of the first valve core to form a primary passage which is cut off by the first valve core when the first valve core is rotated to the first flow bore of the first valve core to be staggered with the flow bore of the valve core cavity;

when the first valve core is rotated to the second flow bore of the first valve core to be communicated with the flow bore of the valve core cavity, and the second valve core is rotated to the flow bore of the second valve core to be communicated with the second flow bore of the first valve core, the fluid passage between the fluid inlet and the fluid outlet is communicated with the flow bore of the valve core cavity through the lower end opening of the second valve core and the flow bore of the second valve core to form a bypass passage which is cut off by a first valve core or a second valve core when the second valve core is rotated to the flow bore of the second valve core to be staggered with the second flow bore of the first valve core or the first valve core is rotated to the second flow bore of the first valve core to be staggered with the flow bore of the valve core cavity.

Alternatively, an angle range of the valve core formed when the first flow bore of the first valve core is communicated with the flow bore of the valve core cavity partially overlaps an angle range of the valve core formed when the second flow bore of the first valve core is communicated with the flow bore of the valve core cavity.

Alternatively, the flow bore of the valve core cavity corresponding to the first flow bore of the first valve core and the flow bore of the valve core cavity corresponding to the second flow bore of the first valve core are the same flow bore of the valve core cavity.

Alternatively, the first valve core and the first valve stem are an integrated structure, and the second valve core and the second valve stem are an integrated structure.

Alternatively, the conical valve further comprises a first fixing nut, a second fixing nut, a first valve stem driving member, a second valve stem driving member, a first elastic member and a second elastic member;

the top end of the first valve stem is provided with an external thread, the first fixing nut is bolted to the top end of the first valve stem, the second valve stem sleeved in the first valve stem penetrates out of the top end of the first valve stem, the top end of the second valve stem is provided with an external thread, and the second fixing nut is bolted to the top end of the second valve stem;

the first valve stem driving member is connected with the first valve stem, and the second valve stem driving member is connected with the second valve stem;

two ends of the first elastic member are respectively connected with the valve body and the first valve stem, and exert an outward pulling force to the first valve stem from the valve body, two ends of the second elastic member are respectively connected with the first valve stem and the second valve stem and exert an outward pulling force from the first valve stem to the second valve stem.

Alternatively, the first elastic member and the second elastic member are elastic gaskets or compression springs;

the first valve stem driving member and the second valve stem driving member are driving wheels or driving stems, the driving wheels take the first valve stem or the second valve stem as a wheel axle, and the driving stems radially extend outward from the first valve stem or the second valve stem.

Alternatively, the conical valve may be a direct-flow conical valve where the fluid flows directly through the valve cavity with a straight passage in the middle. The fluid passage is straight, and the valve stem is disposed at an inclination angle with the straight passage. Alternatively, the conical valve may be an angular-through conical valve, the fluid inlet and outlet axes are at right angles, and the fluid passage of the valve core cavity is disposed to be curved. The valve stem is disposed coaxially with the fluid inlet passage.

Alternatively, the conical valve may be a straight-through conical valve, and the fluid inlet and the fluid outlet are on the same axis. The fluid passage in the valve core cavity is a curvilinear passage, and the valve stem is disposed perpendicular to the fluid inlet or fluid outlet axis.

Alternatively, the valve body comprises a first valve body and a second valve body which are connected at the valve core cavity, the first fluid passage is provided in the first valve body, and the second fluid passage is provided in the second valve body.

Different from the background art, as for the conical valve provided by the above technical solution, when the pipeline is in a cut-off state, the first flow bore of the first valve core and the flow bore of the valve core cavity are staggered, and the flow bore of the second valve core and the second flow bore of the first valve core are staggered, the fluid passage in the valve is cut off, and there is pressure difference between the fluids in the two ends of the valve core. As the area where the first valve core is in contact with the fluid is larger, the pressure exerted on the first valve is greater, making it difficult to be rotated. Relatively speaking, the area where the second valve core is in contact with the fluid is smaller than the area where the first valve core is in contact with the fluid, hence the pressure exerted on the second valve core is smaller than the pressure exerted on the first valve core. The second valve stem can first be rotated to rotate the second valve core before passing through the valve conducted pipeline. When the second valve core is rotated to the flow bore of the second valve core to be communicated with the second flow bore of the first valve core, the fluid passage between the fluid inlet and the fluid outlet is communicated with the second flow bore of the first valve core cavity through the lower end opening of the second valve core and the flow bore of the second valve core, namely through a bypass passage, at this time, since the second valve core conducts the pipelines at two ends of the valve core, the resistance caused by the fluid pressure difference between the two ends of the first valve core to the rotation of the first valve core is reduced, at this time, the first valve stem is rotated to rotate the first valve core, when the first valve core is rotated to the first flow bore of the first valve core to be communicated with the flow bore of the valve core cavity, the fluid passage between the fluid inlet and the fluid outlet is communicated with the flow bore of the valve core cavity through the lower end opening of the first valve core and the first flow bore of the first valve core, i.e. the primary passage is completely conducted. In the meantime, the bypass passage is kept in communication by an arc slot until the primary passage is conducted to be greater than the bypass passage.

When the first flow bore of the first valve core and the flow bore of the valve core cavity overlap to be communicated, the primary fluid passage in the valve is conducted. In order to avoid a greater pressure difference of the fluids on two ends of the first valve core when the primary passage is closed, so as to produce a greater resistance for the rotation of the valve core in the closing phase, the second valve stem may first be rotated to rotate the second valve core to communicate the flow bore of the second valve core with the second flow bore of the first valve core, then the first valve stem is rotated to rotate the first valve core. When the first valve core is rotated to the first flow bore of the first valve core to be staggered with the flow bore of the valve core cavity to be in a size of the primary passage on when the bypass passage is completely opened. The second flow bore of the first valve core has been communicated with the flow bore of the valve cavity through an arc slot, at this time, the bypass fluid passage is conducted, and the bypass passage is kept in communication through the arc slot until the first flow bore of the first valve core is completely staggered with the valve cavity bore, that is to say, the primary passage is cut off by the first valve core, the pressure difference between the two ends of the first valve core is thus greatly reduced due to the bypass passage, the resistance to the rotation of the first valve core is also smaller, when the first flow bore of the first valve core is completely staggered with the flow bore of the valve cavity, then the second valve stem is rotated to rotate the second valve core. When the second valve core is rotated to the flow bore of the second valve core to be staggered with the second flow bore of the first valve core, the bypass passage between the fluid inlet and the fluid outlet is cut off by the second valve core, and the valve is completely closed.

The conical valve is provided with a coaxial second valve core on the basis of the first valve core in an overlapping manner. Meanwhile, a second valve stem rotating the second valve core is sleeved in the first valve stem to make the valve structure be simple and compact, due to the two-staged valve cores can be rotated separately, the separate-staged opening/closing of the valve is realized, which can solve the problem of larger instantaneous resistance when opening and closing the larger conical valve.

DETAILED DESCRIPTION OF THE INVENTION

Figure 1A:
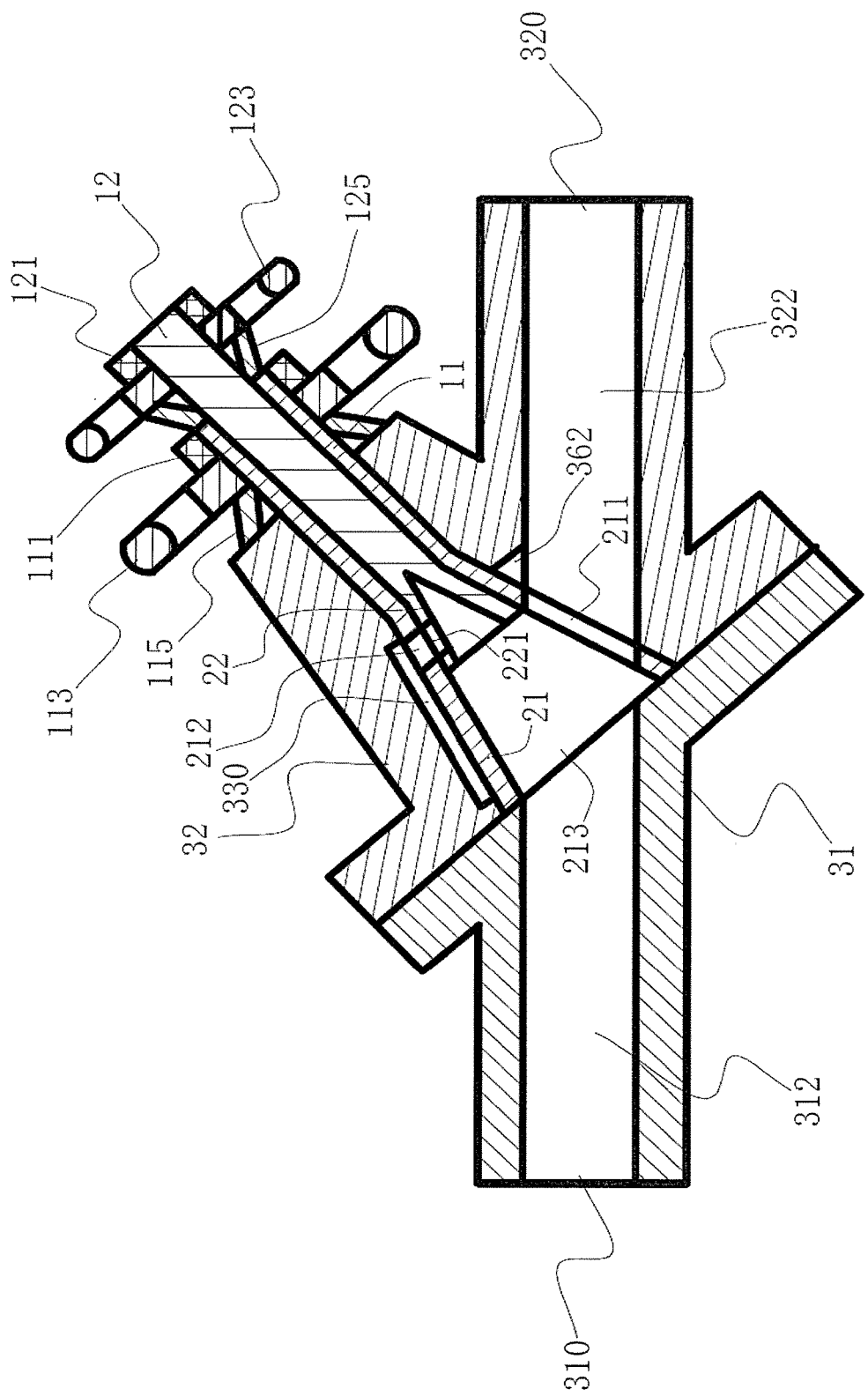
FIG. 1A is a cross-sectional view of the structure of the straight-through conical valve according to an embodiment (conducting state of the primary passage)
Figure 1B:
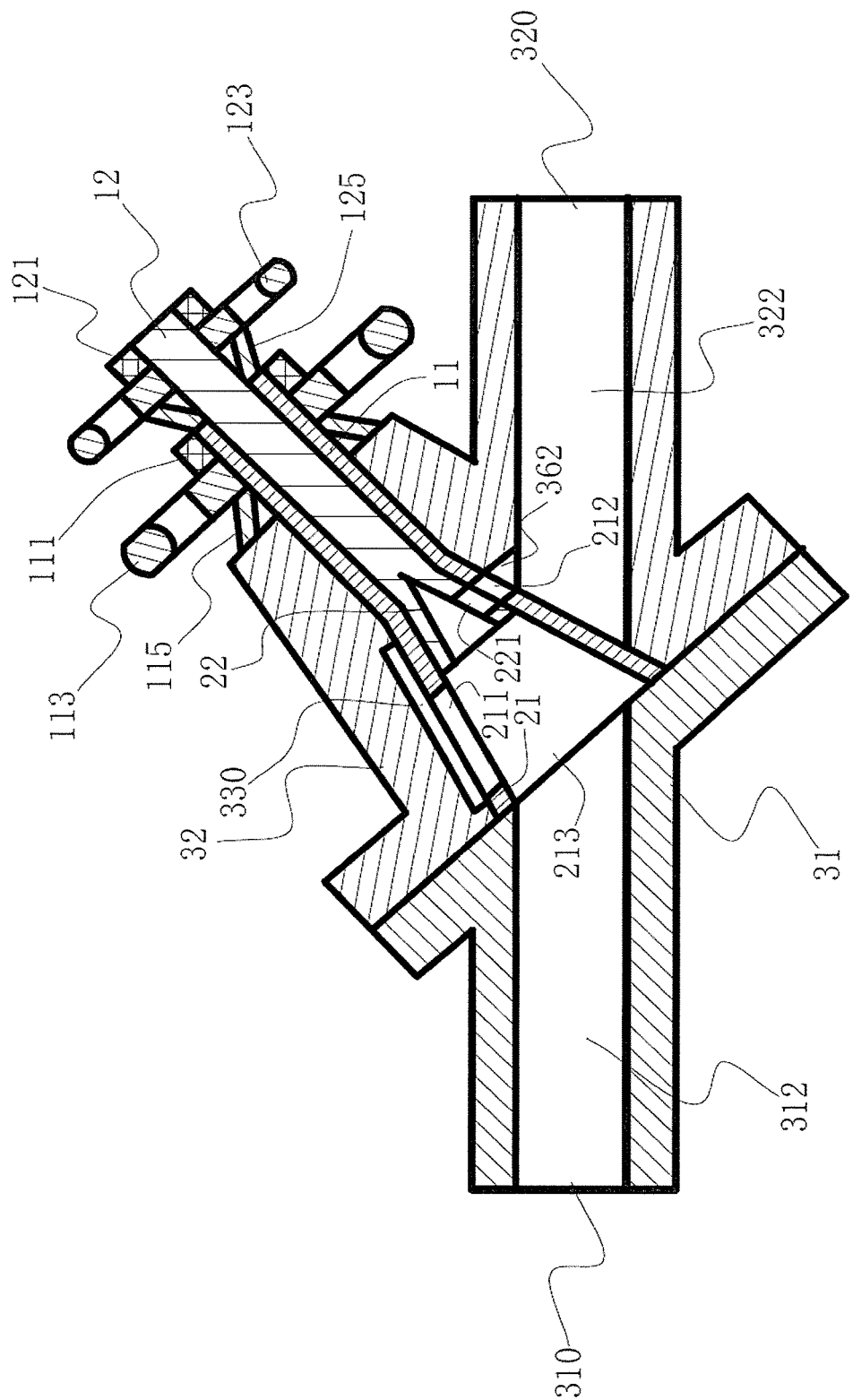
FIG. 1B is a cross-sectional view of the structure of the straight-through conical valve according to an embodiment (conducting state of the bypass passage)

In order to illustrate the technical content, the structural feature, the achievement purpose and the effect of the technical solution in detail, the following embodiments are described in detail with reference to the accompanying drawings.

With reference to FIG. 1A through 3, the embodiment provides a conical valve comprising a valve stem, a valve core and a valve body, the valve stem comprises a first valve stem 11 and a second valve stem 12, and the valve core comprises a first valve core 21 and a second valve core 22; the valve body is provided with a fluid inlet and a fluid outlet, the valve body is provided with a valve core cavity for accommodating the first valve core 21 and the second valve core 22, and a valve stem hole for the first valve stem 11 and the second valve stem 12 to pass through, and the valve stem hole penetrates from a surface of the valve body to the valve core cavity.

The fluid passage between the fluid inlet and the fluid outlet through which the fluid flows is a fluid passage, the fluid passage between the fluid inlet and the valve core cavity is a first fluid passage 312, and the fluid passage between the valve core cavity and the fluid outlet is a second fluid passage 322.

The first valve stem 11 and the second valve stem 12 are coaxially provided, with the second valve stem 12 being sleeved in the first valve stem 11, and the first valve stem and the second valve stem are relatively rotatable and form a sleeved stem structure.

The first valve core 21 and the second valve core 22 are coaxially provided in the valve core cavity, an outer wall of the first valve core is matched with an inner wall of the valve core cavity, the first valve core is connected with the first valve stem and driven by the first valve stem to rotate by taking the first valve stem as an axis; an outer wall of the second valve core is matched with an inner wall of the first valve core, the second valve core is connected with the second valve stem and driven by the second valve stem to rotate by taking the second valve stem as an axis, and the first valve core and the second valve core are relatively rotatable. In an embodiment, the second valve core is smaller than the first valve core. In the embodiment, the matching means that the shapes of the matched valve cores or the valve core and the cavity can be sleeved and matched to achieve the liquid sealing effect. The outer wall of the valve core and the inner wall of the valve core are matched, or the outer wall of the valve core is matched with the inner wall of the valve core cavity to ensure the liquid sealing performance of the valve structure.

In order to improve the rotation performance and sealing performance of the valve core, the inner wall of the valve core cavity or the outer wall of the valve core can be performed lining with PTFE and other materials. In order to improve the sealing performance and reduce the difficulty in machining accuracy of the parts. In the embodiment as shown in FIGS. 1A to 3, a valve cavity slot (non-seal line non-contact slot) 330 is provided in the valve core cavity, the valve cavity slot 330 is disposed along the inner wall of the valve core cavity in a circumferential direction, the lower edge of the valve cavity slot is located above the lower edge of the first valve core, the slot bottom surface of the valve cavity slot 330 is not in contact with the valve core so that the area in which the valve core cavity is in direct contact with the first valve core is relatively reduced, which helps to reduce the resistance of rotation and can perform precision processing on the inner wall of the valve core cavity which is in contact with the first valve core during machining, and it is beneficial to achieve higher machining assembly precision.

In a preferred embodiment, the first valve core and the first valve stem are an integrated structure, and the second valve core and the second valve stem are an integrated structure. Specifically, the first valve core or the second valve core may be made through single piece of metal turning or one-piece casting. An integral valve stem-valve core structure is simple in structure, reliable in strength, and easy in assembly, while the sealing performance between the valve core-valve stem and valve body is reliable.

In different embodiments, the valve stem, the valve core, the valve body and other components may be made of a metal material or polymeric material such as plastics.

The outer walls of the first valve core and the second valve core are conical surfaces. For example, in the embodiment as shown in FIGS. 1A to 3, the outer walls of the first valve core and the second valve core are conical surfaces. In an embodiment, the conical surface is a frustoconical surface or a part of a frustoconical surface, which is generally referred to as a conical surface.

In this embodiment, a conical valve core is adopted, which has a simple structure and is convenient for processing and assembly.

In a preferred embodiment, angle ranges of the conical surfaces of the valve cores are between 33 degrees and 43 degrees. The angle ranges of the conical surfaces on the outer walls of the valve cores are between 33 degrees and 43 degrees, more preferably between 37 degrees and 39 degrees. The angle ranges are beneficial to the decrease of surface area of the outer walls of the valve cores so that a force for rotating the valve cores is relatively small, and conducive to the conservation of materials for manufacturing the valve cores and the reduction of production costs. Angles of the conical surfaces are angles of vertex angles of triangles formed by cross sections of the valve cores along center lines.

A lower end opening of the first valve core 21 and a lower end opening of the second valve core 22 correspond to lower end openings of the conical surfaces, the first valve core 21 is stacked with the second valve core 22, the second valve core 22 is smaller than the first valve core 21, with the first valve core inside and the second valve core outside. The first valve core 21 is provided with a first flow bore 211 of the first valve core and a second flow bore 212 of the first valve core which penetrate the inner wall and the outer wall of the first valve core. A valve core cavity is provided with a flow bore of the valve core cavity corresponding to the first flow bore 211 of the first valve core. When the first valve core 21 is rotated to the first flow bore 211 of the first valve core to be communicated with the flow bore of the valve core cavity, a fluid passage between the fluid inlet 310 and the fluid outlet 320 is communicated with the flow bore of the valve core cavity through the lower end opening of the first valve core and the first flow bore of the first valve core to form a primary passage. The primary fluid passage between the fluid inlet 310 and the fluid outlet 320 is cut off by the first valve core, and the primary passage is cut off when the first valve core 21 is rotated to the first flow bore 211 of the first valve core to be staggered with the flow bore of the valve core cavity.

The second valve core 22 is provided with a flow bore 221 of the second valve core which penetrates the inner wall and the outer wall of the second valve core, the flow bore 221 of the second valve core corresponds to the second flow bore 212 of the first valve core, and the second flow bore 212 of the first valve core corresponds to the arc slot on the flow bore of the valve core cavity. When the second flow bore of the first valve core is communicated with the flow bore of the valve core cavity, and the second valve core 22 is rotated to the flow bore 221 of the second valve core to be communicated with the second flow bore 212 of the first valve core, the fluid passage between the fluid inlet 310 and the fluid outlet 320 is communicated with the flow bore of the valve core cavity through the lower end opening of the second valve core and the flow bore of the second valve core and the second flow bore of the first valve core to form a bypass passage. The fluid passage between the fluid inlet 310 and the fluid outlet 320 is cut off by the second valve core, and the bypass passage is cut off when the second valve core 22 is rotated to the flow bore 221 of the second valve core to be staggered with the second flow bore 212 of the first valve core or the first valve core is rotated to the second flow bore 212 of the first valve core to be staggered with the flow bore of the valve core cavity.

FIGS. 4A to 4D show the relative changes of the positions of the first flow bore of the first valve body, the second flow bore of the first valve body and the flow bore of the valve core cavity during the opening-closing of the valve according to same embodiments.

Figure 4A:
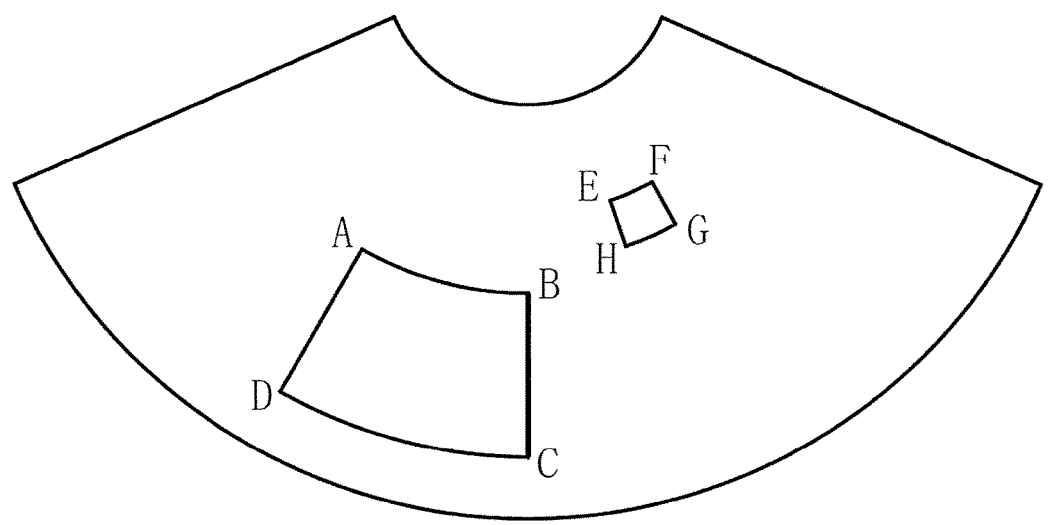
FIGS. 4A to 4D show the relative changes of the positions of the first flow bore of the first valve body, the second flow bore of the first valve body and the flow bore of the valve core cavity during the opening-closing of the valve according to an embodiment.

FIG. 4A is an expanded schematic diagram of the conical surface of the outer surface of the first valve core, wherein the quadrangle ABCD is the first flow bore of the first valve core, and the quadrangle EFGH is the second flow bore of the first valve core.

Figure 4B:
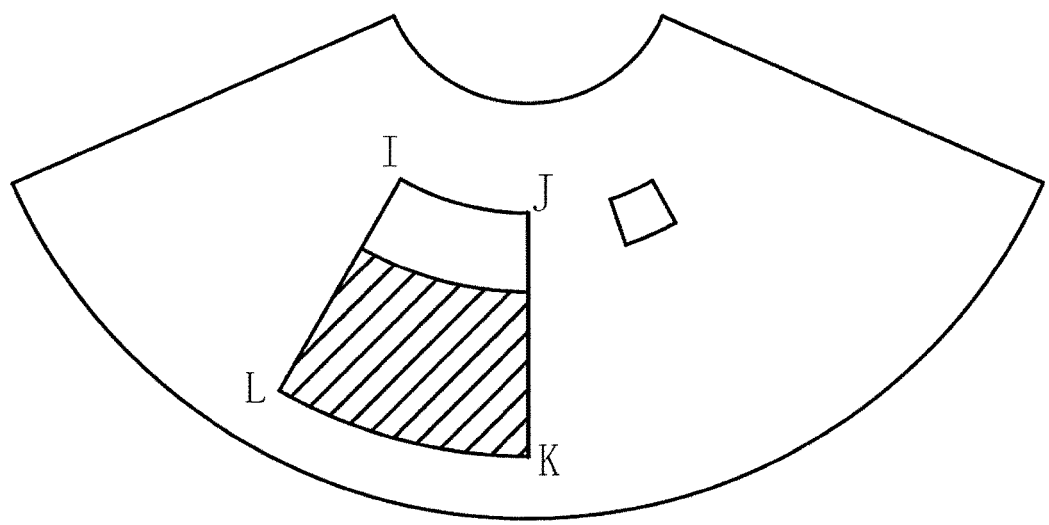
Figure 4C:
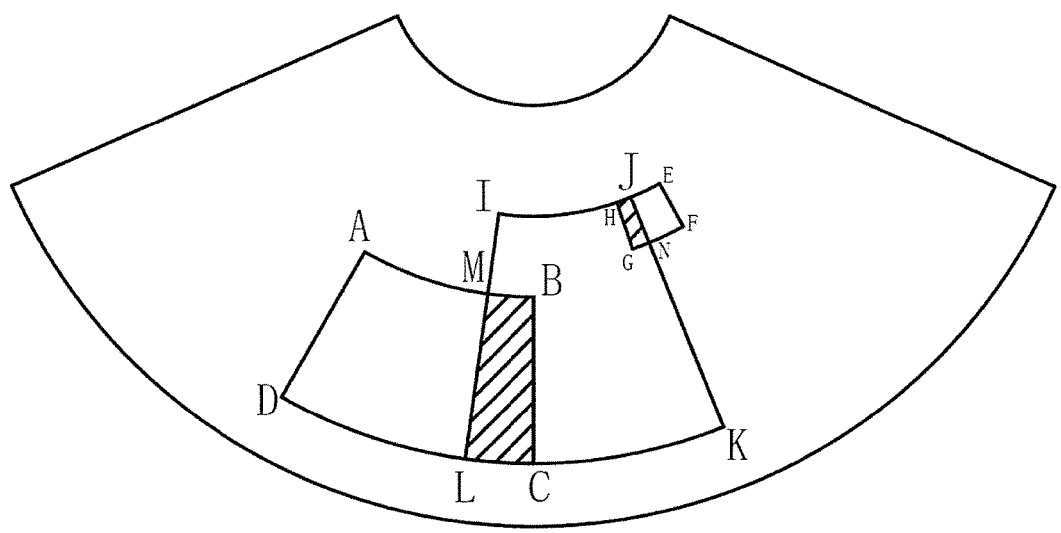
Figure 4D:
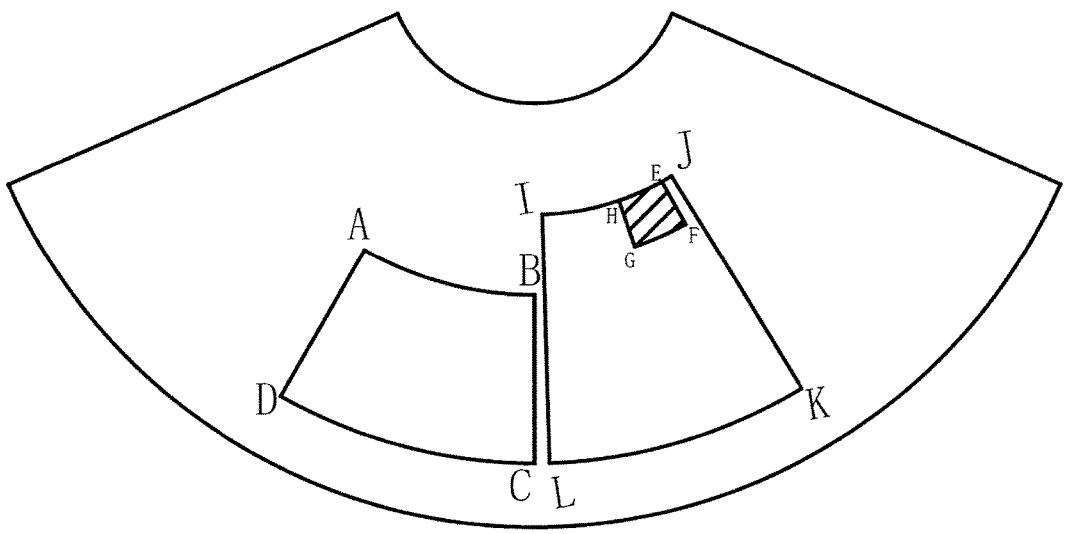

The quadrangle IJKL in FIGS. 4B to 4D is the flow bore of the valve core cavity. During the rotation of the first valve core, there are continuous changes of the relative positions of the flow bore of the valve core cavity with the first flow bore of the first valve core and the second flow bore of the first valve core. When the flow bore of the valve core cavity overlaps the first flow bore of the first valve core or the second flow bore of the first valve core, the fluid passage is conducted and the overlapping portion is shaded in the figure. It should be noted that FIGS. 4A to 4D are merely schematic diagrams for demonstrating the relative positions of various parts in the structure.

FIG. 4B shows the relative position relationship between the flow bores when the valve is in the conducting state. In this case, when the pipe is in a completely conducting state, the first flow bore of the first valve core and the flow bore of the valve core overlap to be communicated with each other, and the fluid in the valve is conducted through the primary passage. At this point, there is no overlapping portion between the second flow bore of the first valve core and the flow bore of the valve core cavity, so the bypass passage is closed.

In order to avoid a greater pressure difference of the fluids on two ends of the first valve core when the valve is closed, so as to produce a greater resistance for the rotation of the first valve core in the closing phase, the first valve stem may be rotated first to rotate the first valve core. The relative position between the flow bore of the valve core cavity and the first flow bore also changes accordingly, in the process of closing the valve gradually, as shown in FIG. 4C, the portion that the first flow bore of the first valve core overlapped by the flow bore of the valve core cavity gradually decreases, that is to say, the area of the quadrangle MBCL as shown in FIG. 4C gradually decreases, during which the second flow bore of the first valve core and the flow bore of the valve core cavity begin to overlap, and the area of overlap between the two gradually increases, that is to say, the area of the quadrangle HJNG as shown in FIG. 4C gradually increases, at this time, maintaining the relative position of the first valve core and the second valve core such that the flow bore of the second valve core is in a communication state with the second flow bore of the first valve core. Then the liquid in the valve can flow through the primary passage or through the bypass passage.

As the first valve core is gradually rotated, the relative position of the first valve core and the valve core cavity changes as it is shown in FIG. 4D. Then the first flow bore of the first valve core and the flow bore of the valve core cavity are staggered, with no overlapping portion therebetween. The primary passage is cut off by the first valve core, but the overlapping portion of the second flow bore of the first valve core and the flow bore of the valve core cavity still conduct the bypass passage. Thus, the pressure difference between the two ends of the valve core is limited, the resistance to the rotation of the first valve core is smaller. When the first flow bore of the first valve core and the flow bore of the valve core cavity are completely staggered, the second valve stem is rotated to rotate the second valve core. When the second valve core is rotated to the flow bore of the second valve core to be staggered with the second flow bore of the first valve core, the bypass passage between the fluid inlet and the fluid outlet is cut off by the second valve core, and the valve is completely closed.

When the valve is opened, the process is exactly opposite to the above process. The sequence of the change of the relative positions of the valve core cavity and the first valve core is as shown in FIGS. 4B, 4C and 4A.

When the pipeline is in a cut-off state, the first flow bore of the first valve core and the flow bore of the valve core cavity are staggered, and the flow bore of the second valve core and the second flow bore of the first valve core are staggered, the fluid passage in the valve is cut off, and there is pressure difference between the fluids in the two ends of the valve core. As the area of the first valve core that is in contact with the fluid is larger, the pressure exerted thereon is greater, making it difficult to be rotated. Relatively speaking, the second valve core is less in contact area with the fluids than with the first valve core, thus the pressure exerted thereon is smaller than on the first valve core. At this time, the relative position between the second flow bore of the first valve core and the flow bore of the valve core cavity is as shown in FIG. 4D, with the two overlapping each other. However, since the flow bore of the second valve core and the second flow bore of the first valve core are staggered, the by-pass passage is still cut off. Before conducting the pipeline through the valve, the second valve stem may be rotated first, the second valve stem is rotated by the second valve stem, and when the second valve core is rotated to the flow bore of the second valve core to be communicated with the second flow bore of the first valve core, the fluid passage between the fluid inlet and the fluid outlet is communicated with the second flow bore of the first valve core through the lower end opening of the second valve core and the flow bore of the second valve core, i.e., through the bypass passage.

Since the second valve core conducts the pipelines at two ends of the first valve core, the resistance caused by the fluid pressure difference between the two ends of the first valve core to the rotation of the first valve core is reduced, then the first valve stem is rotated to rotate the first valve core. The portion that the first flow bore of the first valve core overlapped by the flow bore of the valve core cavity during the rotation of the first valve core gradually decreases. But the first flow bore of the first valve core and the flow bore of the valve core cavity begin to overlap, and the portion that the first flow bore of the first valve core overlapped by the flow bore of the valve core cavity gradually decreases with the rotation of the first valve core, as is shown in FIG. 4C.

Finally, when the first valve core is rotated to the first flow bore of the first valve core to be communicated with the flow bore of the valve core cavity, a fluid passage between the fluid inlet and the fluid outlet is communicated with the flow bore of the valve core cavity through the lower end opening of the first valve core and the first flow bore of the first valve core, i.e., conducted through the primary passage. At this time, the second flow bore of the first valve core and the flow bore of the valve core cavity no longer overlap, and the relative position of each part is as shown in FIG. 4B.

In the above embodiment, an angle range of the valve core formed when the first flow bore of the first valve core is communicated with the flow bore of the valve core cavity partially overlaps an angle range of the valve core formed when the second flow bore of the first valve core is communicated with the flow bore of the valve core cavity. That is to say, when the relative positions of the first valve core and the valve core cavity are within certain angle ranges, the first flow bore of the first valve core and the second flow bore of the first valve core can be conducted through the flow bore of the valve core cavity, which is in a state as shown in FIG. 4C.

Figure 5A:
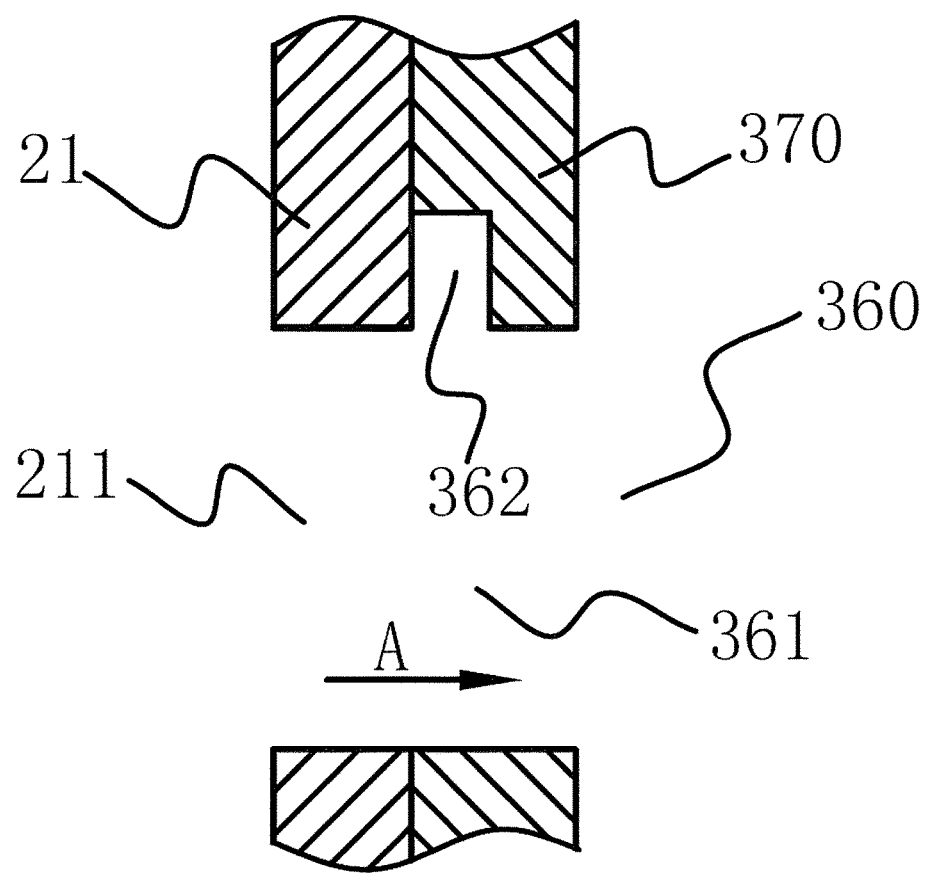
FIG. 5A is a longitudinal cross-sectional view of a first valve core and a valve core cavity at a flow bore of the valve core cavity when the primary passage of the conical valve is in a conducting state according to the embodiment as shown in FIG. 1A.
Figure 5B:
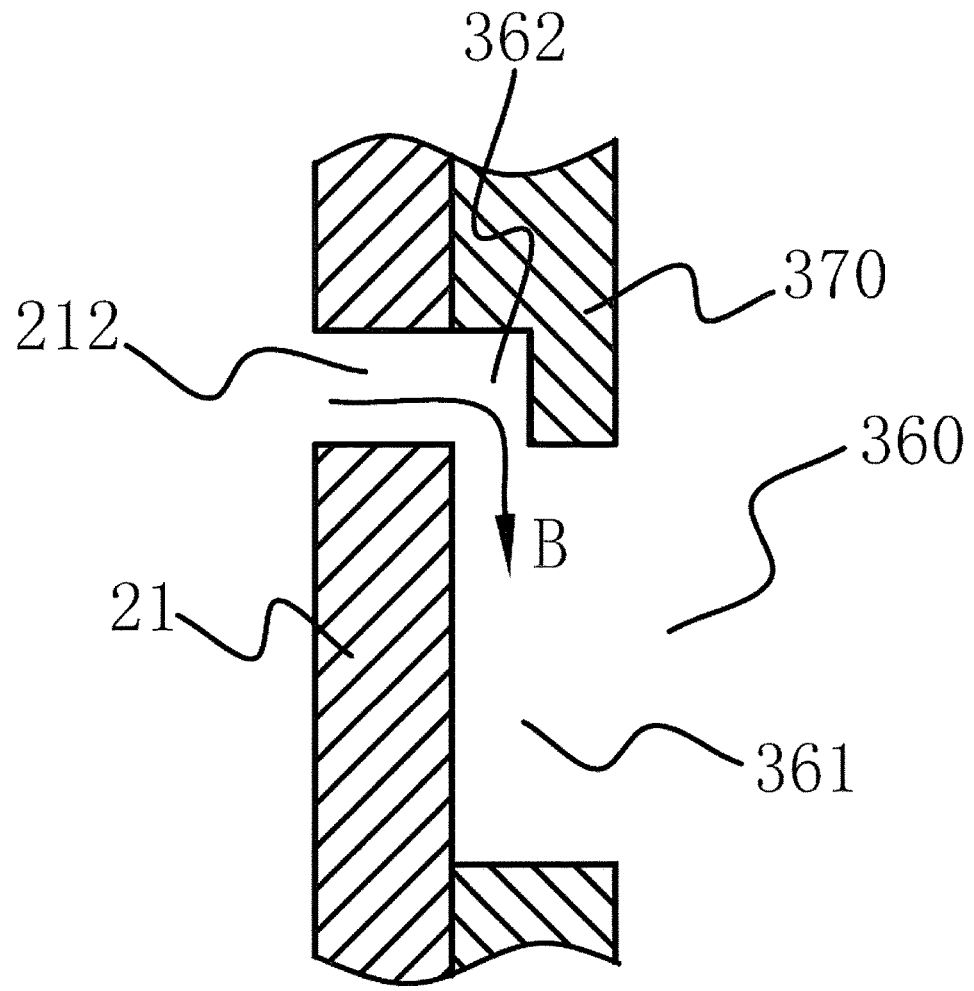
FIG. 5B is a longitudinal cross-sectional view of a first valve core and a valve core cavity at a flow bore of the valve core cavity at a conducting state of the bypass passage of the conical valve according to the embodiment as shown in FIG. 1B.
Figure 6:
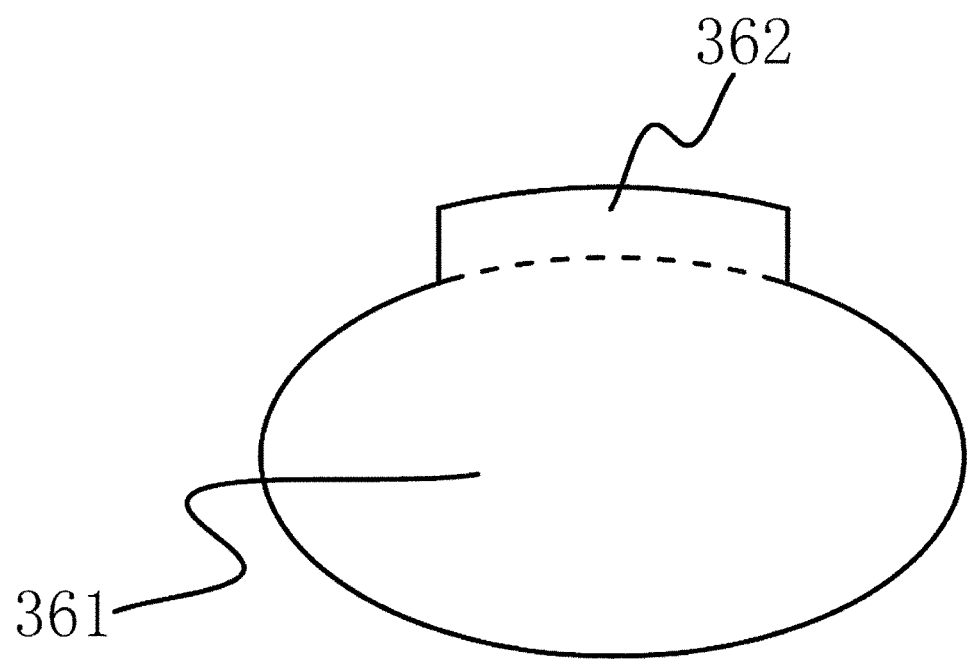
FIG. 6 is an expanded schematic view of the flow bore of the valve core cavity on the conical surface of the inner surface of the valve core cavity.

Specifically, the structure of the flow bore 360 of the valve cavity can be referred to FIGS. 5A, 5B and 6, the portion 361 of the flow bore of the valve core cavity corresponding to the first flow bore of the first valve core is a through hole, the portion 362 of flow bore of the valve core cavity corresponding to the second flow bore of the first valve core is a slot (arc slot) provided on the valve cavity wall 370. The slot structure is located above the through hole of the flow bore of the valve core cavity corresponding to the first flow bore of the first valve core, and is communicated with the through hole. When the primary passage of the conical valve is in a conducting state, which is as shown in FIG. 5A, the liquid flows in a direction as shown by an arrow A in the figure. When the conical valve bypass passage is in the conducting state, as shown in FIG. 5B, the liquid flows in a direction as shown by an arrow B in the figure.

In the above embodiment, the opening and the closing of the two flow bores in the first valve core are controlled by one flow bore of the valve core cavity. Of course, in other embodiments, the first flow bore of the first valve core cavity and the second flow bore of the first valve are respectively provided with a flow bore of the valve core cavity. That is to say, in other embodiments, the number of the flow bores of the valve core cavities may not only be one, but may be two or more.

In order to provide a sealing structure and a rotating structure suitable for a conical valve, the conical valve further comprises a first fixing nut 111, a second fixing nut 121, a first valve stem driving member, a second valve stem driving member, a first elastic member and a second elastic member.

The first valve stem driving member is connected with the first valve stem, and the second valve stem driving member is connected with the second valve stem; In the embodiments as shown in FIGS. 1A to 3, the first valve stem driving member and the second valve stem driving member are driving wheels, and the driving wheels include a first driving wheel 113 having a first valve stem 11 as the wheel axle and a second driving wheel 123 having a second valve stem 12 as the wheel axle.

In other embodiments, the first valve stem driving member and the second valve stem driving member are driving stems; the drive stem extends radially outward from the first valve stem or the second valve stem. The number of the first driving stem may be one or more. For example, four first driving stems may be provided in a cross pattern, or four first driving stems may be provided in a Y pattern. The second drive stem is arranged similar to the first drive stem.

In the embodiment, the arm of force during the rotation of the valve stems is extended by the first valve stem driving member and the second valve stem driving member, so that the valve stems are rotated with less effort.

In the embodiment as shown in FIGS. 1A to 3, the first elastic member and the second elastic member are compression springs. Specifically, the first elastic member is a first compression spring 115 and the second elastic member is a second compression spring 125; the first valve stem 11 passes through the first compression spring 115 and the second valve stem 12 passes through the second compression spring 125.

In another embodiment, the first elastic member and the second elastic member may be elastic gaskets, such as rubber gaskets or silicone gaskets.

The top end of the first valve stem is provided with an external thread, the first fixing nut is bolted to the top end of the first valve stem, the second valve stem sleeved in the first valve stem penetrates out of the top end of the first valve stem, the top end of the second valve stem is provided with an external thread, and the second fixing nut is bolted to the top end of the second valve stem;

two ends of the first compression spring 115 are respectively connected with the valve body and the first valve stem 11. Specifically, one end of the first compression spring 115 abuts against the valve body and is connected to the valve body, and the other end abuts against the first valve stem 11 or against the first driving wheel 113 or the first fixing nut 111 so as to be directly or indirectly connected with the first valve stem.

Two ends of the second compression spring 125 are respectively connected to the first valve stem 11 and the second valve stem 12. Specifically, one end of the second compression spring 125 abuts against the first valve stem or the first fixing nut 111, and is directly or indirectly connected to the first valve stem, the other end abuts against the second valve stem 12 or against the second driving wheel 123 or the second fixing nut 121 so as to be directly or indirectly connected to the second valve stem.

Regardless of the connection method used for the elastic element, two ends of the first elastic member may respectively apply force to the valve body and the first valve stem to apply a pulling force to the first valve stem from the valve body. Similarly, two ends of the two elastic members respectively apply force to the second valve stem and the first valve stem so as to apply a pulling force from the first valve stem to the second valve stem to achieve the above effect.

Since the first elastic member and the second elastic member exert an outward pulling force on the valve stem to exert an outward pulling force on the valve core, the outer wall of the valve core is in close contact with the inner wall of the valve core cavity to improve the sealing performance of the valve. In the embodiment as shown in FIGS. 1A to 3, the outer walls of the first valve core and the second valve core are conical surfaces. The diameter of the lower opening of the valve core is larger than the diameter of the upper end of the valve core. When an external force causes the valve core to move upward (i.e. outward), the valve core and the valve core cavity wall are closer.

In the above embodiment, the elasticity of the first elastic member or the second elastic member may be adjusted by rotating the height of the first fixing nut 111 or the second fixing nut 121 so as to adjust the sealing performance and the rotation damping of the valve.

Based on the idea provided by the inventor, conical valves with straight through valve structure or conical valve with angular valve structure can be prepared according to different needs.

In the embodiment as shown in FIG. 1A for example, the fluid passage between the fluid inlet and the valve core cavity is a first fluid passage 312, and the fluid passage between the valve core cavity and the fluid outlet is a second fluid passage 322. The first fluid passage 312 and the second fluid passage 322 are connected in a straight passage, the valve stem (including the first valve stem 11 and the second valve stem 12) is disposed at an inclination angle with the straight passage, the lower end opening 213 of the first valve core is communicated with the first fluid passage 312, and the flow bore of the valve core cavity is opposite to the second fluid passage 322. The shown inclination angle is a non-perpendicular angle provided in an inclination manner. In a preferred embodiment, the inclination angle (the angle between the valve stem and the fluid passage) is from 30 to 60 degrees, more preferably from 40 to 50 degrees, still more preferably 45 degrees. That is to say, the conical valve may be a direct-flow conical valve where the fluid flows directly through the valve cavity with a straight passage in the middle. The fluid passage is straight, and the valve stem is disposed at an inclination angle with the straight passage. In this embodiment, the fluid flows through the valve in a straight line with little fluid flow resistance.

Figure 2:
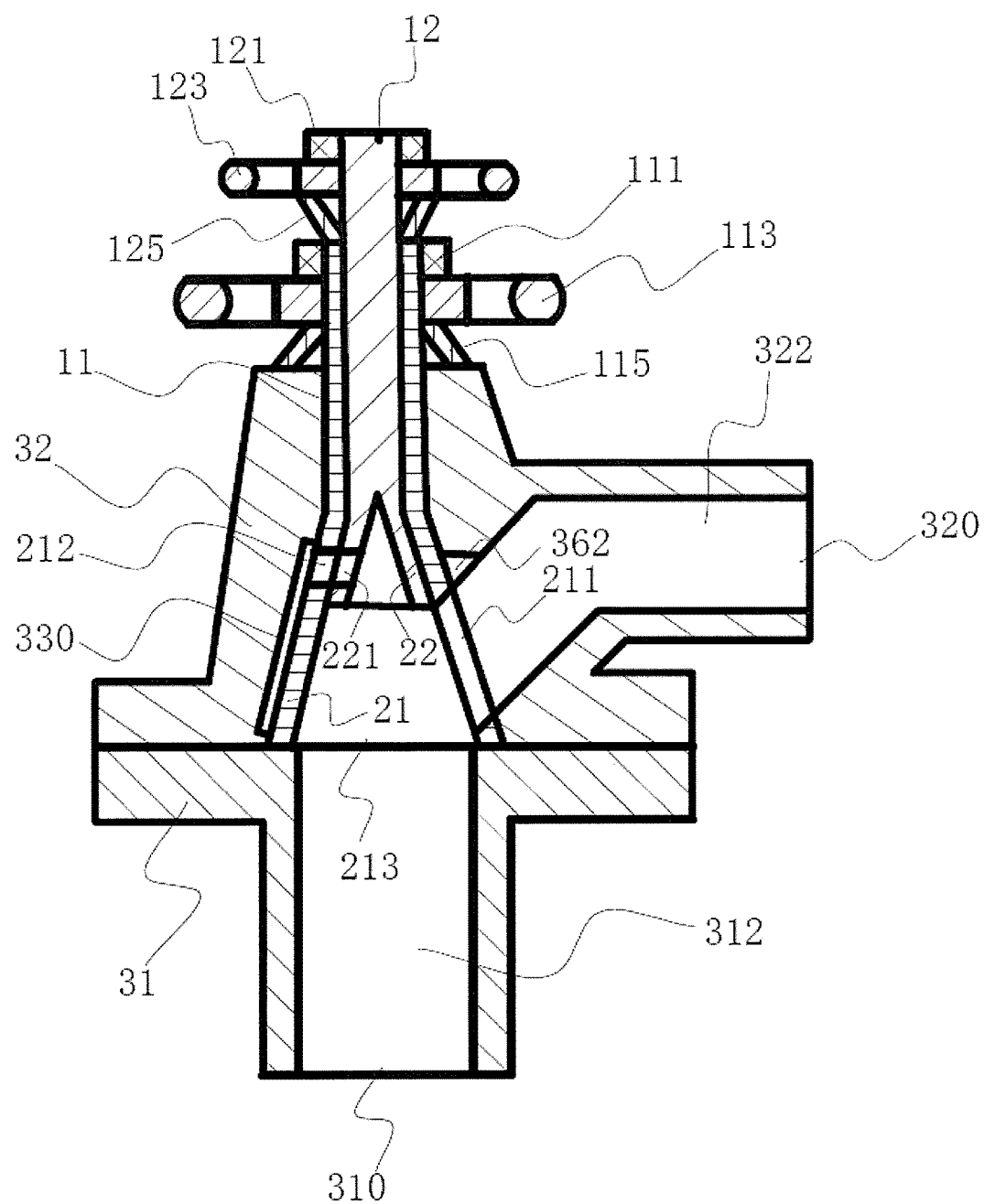
FIG. 2 is a cross-sectional view of the structure of the angular-through conical valve according to an embodiment.

In the embodiment as shown in FIG. 2, the inventor provides an embodiment of an angular-through valve in which the fluid passage between the fluid inlet and the valve core cavity is a first fluid passage 312, the fluid passage between the valve core cavity and the fluid outlet is a second fluid passage 322, and the first fluid passage 312 and the second fluid passage 322 are connected at a right angle, a non-straight angle. Further, the first fluid passage 312 and the second fluid passage 322 are connected at a right angle. The valve stem is perpendicular to an axial direction of one of the inlet or outlet (i.e., disposed in parallel with one of the first fluid passage or the second fluid passage), and the lower end opening 213 of the first valve member is opposite to the first fluid passage 312. The flow bore of the valve core cavity is opposite to the second fluid passage 322. That is to say, the conical valve may be an angular-through conical valve, the fluid inlet and outlet axes are at right angles, and the fluid passage of the valve core cavity is curved. The valve stem is disposed coaxially with the fluid inlet passage.

Figure 3:
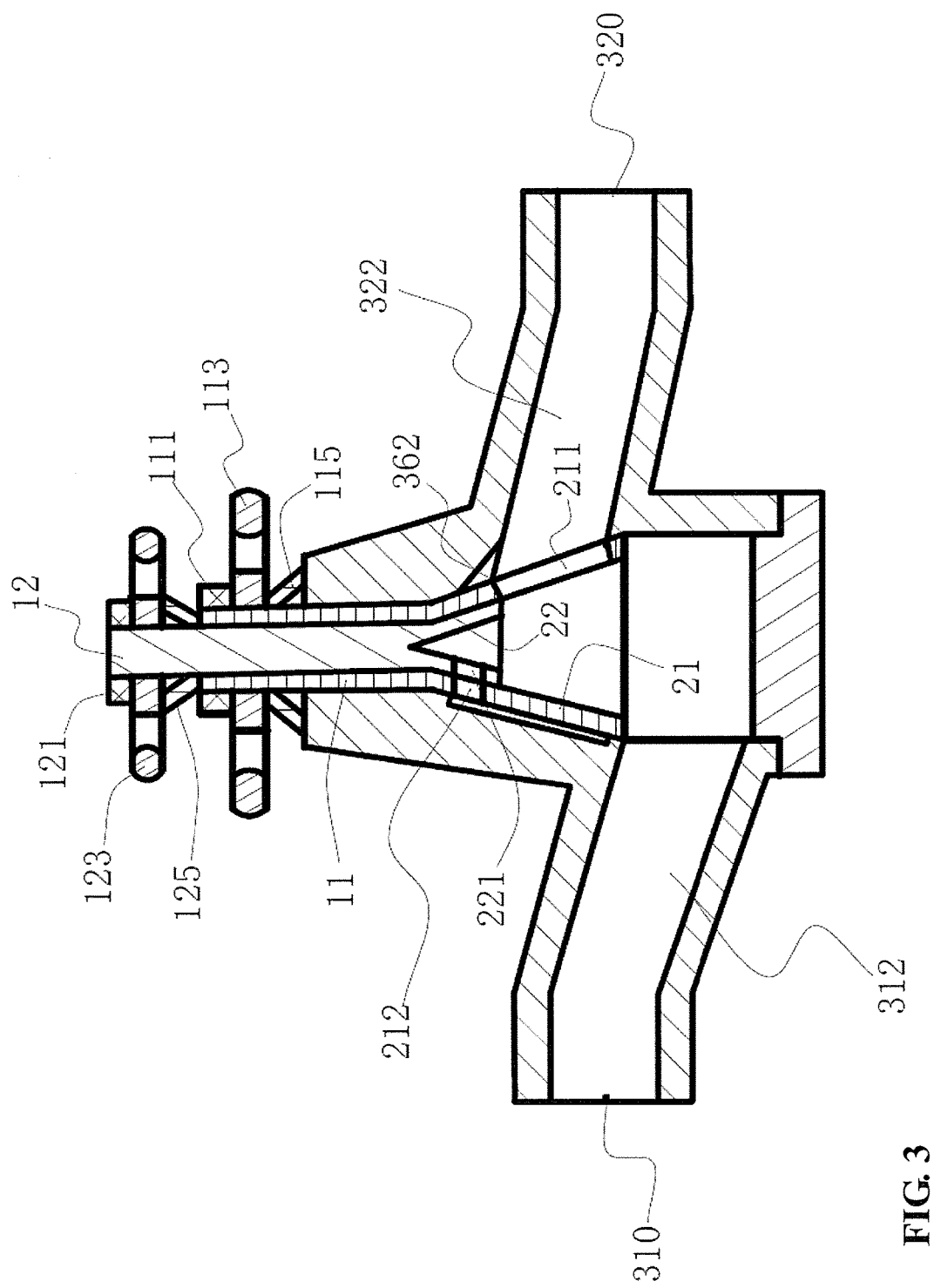
FIG. 3 is a cross-sectional view of the structure of the straight-through conical valve according to an embodiment.

In the embodiment as shown in FIG. 3, the inventor provides an embodiment of an straight-through valve in which the fluid passage between the fluid inlet and the valve core cavity is a first fluid passage 312, the fluid passage between the valve core cavity and the fluid outlet is a second fluid passage 322, and the first fluid passage 312 and the second fluid passage 322 are disposed to be staggered up and down, and the inlet and the outlet are coaxial. The valve stem is disposed at a right angle to the fluid inlet and outlet axes. The lower end opening 213 of the first valve member is opposite to the first fluid passage 312. The flow bore of the valve core cavity is opposite to the second fluid passage 322. That is to say, the conical valve may be a straight-through conical valve, and the fluid inlet and the fluid outlet are on the same axis. The fluid passage in the valve core cavity is a curvilinear passage, and the valve stem is disposed perpendicular to the fluid inlet or fluid outlet axis.

In the above embodiment, the position of the fluid outlet of the valve and the position of the fluid inlet can be transposed, that is to say, the flow direction of the liquid in the valve can be reversed. For example, the fluid inlet is disposed at one end of the second fluid passage, the fluid outlet is disposed at one end of the first fluid passage, and such structure can also play the role of the valve to open or close the pipeline.

In the embodiment as shown in FIGS. 1A to 3, the valve body comprises a first valve body 31 and a second valve body 32 which are connected at the valve core cavity, the first fluid passage 312 is provided in the first valve body 31, and the second fluid passage 322 is provided in the second valve body 32. In FIG. 1A, the first valve body is a left valve body and the second valve body is a right valve body. In FIG. 3, the first valve body is a lower valve body, the second valve body is an upper valve body. Such a split valve body structure can be used to facilitate the assembly and maintenance, as well as improve the sealing performance of the valve. The first valve body and the second valve body are connected via flange structure connection, threaded connection, a riveting or welding, and the like.

It should be noted that, relational terms such as "first" and "second" herein are merely used to distinguish an entity or an operation from another entity or operation without necessarily requiring or implying any actual such relationship or order between such entities or operations. Moreover, the term "include", "comprise" and any variants thereof are intended to cover non-exclusive inclusions such that a process, method, article, or terminal device that includes a series of elements not only includes those elements but also includes other elements that are listed explicitly, or also includes inherent elements of this process, method, item, or terminal device. In the absence of more restrictions, the elements defined by the sentence "comprising . . . " or "including . . . " do not preclude other elements existing in the process, method, article or terminal device that includes the elements. In addition, in this context, "greater than", "less than", "exceed" and so on are understood as not including the number itself; "above", "below", "within" and so on are understood as including the number itself.

Although the embodiments have been described above, those skilled in the art are may make additional changes and modifications to these embodiments based on the basic creative concept. Therefore, the foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A tandem conical valve, comprising a valve stem, a valve core and a valve body, the valve stem comprises a first valve stem and a second valve stem, and the valve core comprises a first valve core and a second valve core;

the valve body has a fluid inlet and a fluid outlet, the valve body is provided with a valve core cavity for accommodating the first valve core and the second valve core, and a valve stem hole for the first valve stem and the second valve stem to pass through, and the valve stem hole penetrates from a surface of the valve body to the valve core cavity;

the first valve stem and the second valve stem are coaxially provided, with the second valve stem being sleeved in the first valve stem, and the first valve stem and the second valve stem are relatively rotatable;

the first valve core and the second valve core are coaxially provided in the valve core cavity, an outer wall of the first valve core is matched with an inner wall of the valve core cavity, the first valve core is connected with the first valve stem and driven by the first valve stem to rotate by taking the first valve stem as an axis, an outer wall of the second valve core is matched with an inner wall of the first valve core, the second valve core is connected with the second valve stem and driven by the second valve stem to rotate by taking the second valve stem as an axis, and the first valve core and the second valve core are relatively rotatable;

the outer walls of the first valve core and the second valve core are conical surfaces, a lower end opening of the first valve core and a lower end opening of the second valve core correspond to lower end openings of the conical surfaces, the first valve core is stacked with the second valve core, the second valve core is smaller than the first valve core, the first valve core is provided with a first flow bore of the first valve core and a second flow bore of the first valve core which penetrate the inner wall and the outer wall of the first valve core, the valve core cavity is provided with a flow bore of the valve core cavity corresponding to the first flow bore of the first valve core and the second flow bore of the first valve core, the second valve core is provided with a flow bore of the second valve core which penetrates the inner wall and the outer wall of the second valve core, and the flow bore of the second valve core corresponds to the second flow bore of the first valve core;

when the first valve core is rotated to the first flow bore of the first valve core to be communicated with the flow bore of the valve core cavity, a fluid passage between the fluid inlet and the fluid outlet is communicated with the flow bore of the valve core cavity through the lower end opening of the first valve core and the first flow bore of the first valve core to form a primary passage which is cut off by the first valve core when the first valve core is rotated to the first flow bore of the first valve core to be staggered with the flow bore of the valve core cavity;

when the first valve core is rotated to the second flow bore of the first valve core to be communicated with the flow bore of the valve core cavity and the second valve core is rotated to the flow bore of the second valve core to be communicated with the second flow bore of the first valve core, the fluid passage between the fluid inlet and the fluid outlet is communicated with the flow bore of the valve core cavity through the lower end opening of the second valve core, the flow bore of the second valve core and the second flow bore of the first valve core to form a bypass passage which is cut off by the second valve core or the first valve core when the second valve core is rotated to the flow bore of the second valve core to be staggered with the second flow bore of the first valve core or the first valve core is rotated to the second flow bore of the first valve core to be staggered with the flow bore of the valve core cavity.

2. The conical valve according to claim 1, wherein an angle range of the valve cores formed when the first flow bore of the first valve core is communicated with the flow bore of the valve core cavity partially overlaps an angle range of the valve cores formed when the second flow bore of the first valve core is communicated with the flow bore of the valve core cavity.

3. The conical valve according to claim 2, wherein the flow bore of the valve core cavity corresponding to the first flow bore of the first valve core and the flow bore of the valve core cavity corresponding to the second flow bore of the first valve core are the same flow bore of the valve core cavity.

4. The conical valve according to claim 1, wherein the first valve core and the first valve stem are an integrated structure, and the second valve core and the second valve stem are an integrated structure.

5. The conical valve according to claim 1, wherein the conical valve further comprises a first fixing nut, a second fixing nut, a first valve stem driving member, a second valve stem driving member, a first elastic member and a second elastic member;
- a top end of the first valve stem is provided with an external thread, the first fixing nut is bolted to the top end of the first valve stem, the second valve stem sleeved in the first valve stem penetrates out of the top end of the first valve stem, a top end of the second valve stem is provided with an external thread, and the second fixing nut is bolted to the top end of the second valve stem;
- the first valve stem driving member is connected with the first valve stem, and the second valve stem driving member is connected with the second valve stem;
- two ends of the first elastic member are respectively connected with the valve body and the first valve stem, and exert an outward pulling force to the first valve stem from the valve body; and two ends of the second elastic member are respectively connected with the first valve stem and the second valve stem and exert an outward pulling force to the second valve stem from the first valve stem.

6. The conical valve according to claim 5, wherein the first elastic member and the second elastic member are elastic gaskets or compression springs;
- the first valve stem driving member and the second valve stem driving member are driving wheels or driving stems, the driving wheels take the first valve stem or the second valve stem as a wheel axle, and the driving stems radially extend outward from the first valve stem or the second valve stem.

* * * * *